(12) United States Patent
Kobayashi

(10) Patent No.: US 7,343,668 B2
(45) Date of Patent: Mar. 18, 2008

(54) METHOD OF MANUFACTURING PERPENDICULAR MAGNETIC RECORDING HEAD CAPABLE OF HIGHLY PRECISELY DEFINING GAP DISTANCE

(75) Inventor: Kiyoshi Kobayashi, Niigata-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 0 days.

(21) Appl. No.: 11/525,182

(22) Filed: Sep. 21, 2006

(65) Prior Publication Data
US 2007/0067982 A1    Mar. 29, 2007

(30) Foreign Application Priority Data
Sep. 26, 2005    (JP)    ............................. 2005-278283

(51) Int. Cl.
G11B 5/127    (2006.01)
H04R 31/00    (2006.01)

(52) U.S. Cl. .................. 29/603.16; 29/603.11; 29/603.13; 29/603.15; 29/603.18; 29/605; 29/606; 216/62; 216/66; 216/67; 360/121; 360/126; 360/317; 427/127; 427/128; 451/5; 451/41

(58) Field of Classification Search ............. 29/603.11, 29/603.13–603.16, 605, 606; 216/62, 66, 216/67; 360/121, 123, 126, 317; 427/127, 427/128; 451/5, 41
See application file for complete search history.

(56) References Cited

U.S. PATENT DOCUMENTS

| 6,266,216 B1 * | 7/2001 | Hikami et al. .............. 360/317 |
| 6,751,071 B2 * | 6/2004 | Yazawa et al. ............. 360/319 |
| 2005/0083608 A1 | 4/2005 | Watanabe |

FOREIGN PATENT DOCUMENTS

JP    2005-122831    5/2005

* cited by examiner

*Primary Examiner*—Paul D. Kim
(74) *Attorney, Agent, or Firm*—Brinks Hofer Gilson & Lione

(57) ABSTRACT

A method of manufacturing a perpendicular magnetic recording head is provided. The method accurately defines a gap layer. The method includes forming a lower gap layer made of a non-magnetic material on a main magnetic pole layer. An upper gap layer is formed on the lower gap layer, the upper gap layer being made of the non-magnetic material. A resist layer is formed on the upper gap layer, and the resist layer is removed from an end surface. The upper gap layer not covered with the resist layer is removed, while exposing a new film surface by removing a surface oxidation layer of the resist layer. A return path layer is formed by plating on the exposed lower gap layer, the upper gap layer, and the resist layer through the plating underlayer.

10 Claims, 3 Drawing Sheets

METHOD OF MANUFACTURING PERPENDICULAR MAGNETIC RECORDING HEAD CAPABLE OF HIGHLY PRECISELY DEFINING GAP DISTANCE

This application claims the benefit of Japanese Patent Application No. 2005-278283 filed on Sep. 26, 2005, which is hereby incorporated by this reference.

BACKGROUND

1. Field

The present embodiments relate to a perpendicular magnetic recording head that performs a recording operation.

2. Related Art

A magnetic head device includes a longitudinal recording (in-plane recording) magnetic head device that applies a magnetic field parallel to a plane of a recording medium thereto to perform a recording operation, and a perpendicular magnetic recording head device that applies a magnetic field perpendicular to a plane of the recording medium thereto to perform a recording operation. The perpendicular magnetic recording head device is further suitable to increase the recording density.

Conventionally, the perpendicular magnetic recording head has a structure in which a main magnetic pole layer and a return path layer are laminated with a non-magnetic insulating layer therebetween at a surface facing a recording medium. The main magnetic pole layer and the return path layer are magnetically connected to each other at the rear of a surface facing a recording medium in a height direction. Coil layers that applies a recording magnetic field to the main magnetic pole layer and the return path layer are provided in the gap layer.

When current is supplied to the coil layers, a recording magnetic field is induced between the main magnetic pole layer and the return path layer. In this case, the recording magnetic field is perpendicularly applied to a hard film of the recording medium from the front end surface of the main magnetic pole layer exposed to the medium facing surface, and the recording magnetic field returns to the return path layer through a soft film of the recording medium. Accordingly, a magnetic recording is performed at a portion facing the main magnetic pole layer.

In the above perpendicular magnetic recording head, the main magnetic pole layer, the gap layer, and the return path layer may be formed, for example, as follows. The gap layer made of $Al_2O_3$ and a resist layer are formed so as to be subsequently laminated on the main magnetic pole layer made of a magnetic material. The resist layer is removed from the end surface serving as the medium facing surface to a position as a predetermined depth dimension by using photolithography process (exposure, development), and the gap layer is exposed to the removed region. The depth dimension of the exposed gap layer is a throat height. In addition, a dry etching (milling) as plating pre-treatment is performed, a plated underlayer is formed on the gap layer and the resist layer, and the return path layer is formed on the plated underlayer by plating. The formation of the gap layer and the return path layer are accomplished.

The above-mentioned perpendicular magnetic recording head and a method of manufacturing the same are disclosed in JP-A-2005-122831.

In the above-mentioned perpendicular magnetic recording head, the thickness of the gap layer, for example, the gap distance is an important parameter that determines the writing performance (recording magnetic field strength and recording resolution) of the perpendicular magnetic recording head. Accordingly, it is required to define the gap distance.

In a manufacturing method of the related art, since the gap layer made of $Al_2O_3$ is eroded by the alkali developing solution used in the photolithography process in removing of the resist layer, and the gap layer is cut by the dry etching, which performs as a pre-treatment in forming of the plated underlayer or the coil layer, the film thickness of the gap layer becomes thinner in accordance with the passage of the manufacturing process, and it is difficult to control the gap distance at the accomplishment state of the head.

SUMMARY

The present embodiments provide, for example, a method of manufacturing a perpendicular magnetic recording head, which defines a gap distance with a high precision.

The embodiments have been made in view of the fact that when forming the gap layer to a double structure having a lower gap layer and an upper gap layer, exposing the lower gap layer by removing the upper gap layer of a surface facing a recording medium, and forming a return path layer on the exposed lower gap layer, the lower gap layer is protected from the etching or the developing solution during the manufacturing process by the upper gap layer, thus defining the gap distance to by the thickness during forming film of the lower gap layer.

For example, according to one embodiment, a method of manufacturing a perpendicular magnetic recording head includes forming a lower gap layer made of a non-magnetic material on a main magnetic pole layer so that the lower gap layer has a thickness equal to a predetermined gap distance, forming an upper gap layer on the lower gap layer, the upper gap layer being made of a non-magnetic material, which is not eroded by a developing solution and which has an etching rate higher than a material of the lower gap layer, forming a resist layer on the upper gap layer, removing a portion of the resist layer that corresponds to a range of an end surface serving as a medium facing surface to a position, at which a predetermined throat height is obtained, through exposure, development, and etching, so that the upper gap layer is exposed through the removed portion, performing a dry etching as a plating pre-treatment to expose a new surface of the resist layer and to remove an area of the upper gap layer that is not covered with the resist layer, so that the lower gap layer is exposed through the removed area, and forming a plating underlayer on the exposed lower gap layer, the upper gap layer, and the resist layer, and forming a return path layer on the plating underlayer by plating.

A rising angle of the end surface close to the medium facing surface of the upper gap layer may differ from a rising angle of the end surface close to the medium facing surface of the resist layer. Furthermore, the rising angle of the end surface close to the medium facing surface of the upper gap layer may be controlled by an etching angle in the plating pre-treatment.

According to this embodiment, since the rising angle (throat shape) of the end surface of the rear side in the height direction of the return path layer is in two stages, the gap distance becomes wider at the rear side in the height direction than at the medium facing surface, and the writing performance (recording magnetic field strength) may be controlled with a good balance. The magnitude relation of the rising angles of the upper gap layer and the resist layer is properly set according to the desired recording resolution and the writing performance.

If a developing solution used in developing of the resist layer is alkali solution, the lower gap layer may be formed of, for example, Al$_2$O$_3$, and the upper gap layer may be formed of, for example, any of SiO$_2$, Ru, or Au.

The resist layer may be a coil insulating layer, which covers a coil layer applying a recording magnetic field to a main magnetic pole layer and the return path layer. In addition, the film thickness of the lower gap layer may be formed in the range of about 5 nm to 150 nm, and more preferably, about 30 nm to 70 nm.

According to the a present embodiment, since the lower gap layer is protected by the upper gap layer, while not suffering damage by the etching or the developing solution during the manufacturing process, it can obtain a method of manufacturing a perpendicular magnetic recording head of which the gap distance is very accurately defined by the thickness during forming film of the lower gap layer.

DESCRIPTION OF THE PREFERRED EMBODIMENT

Figure 1:
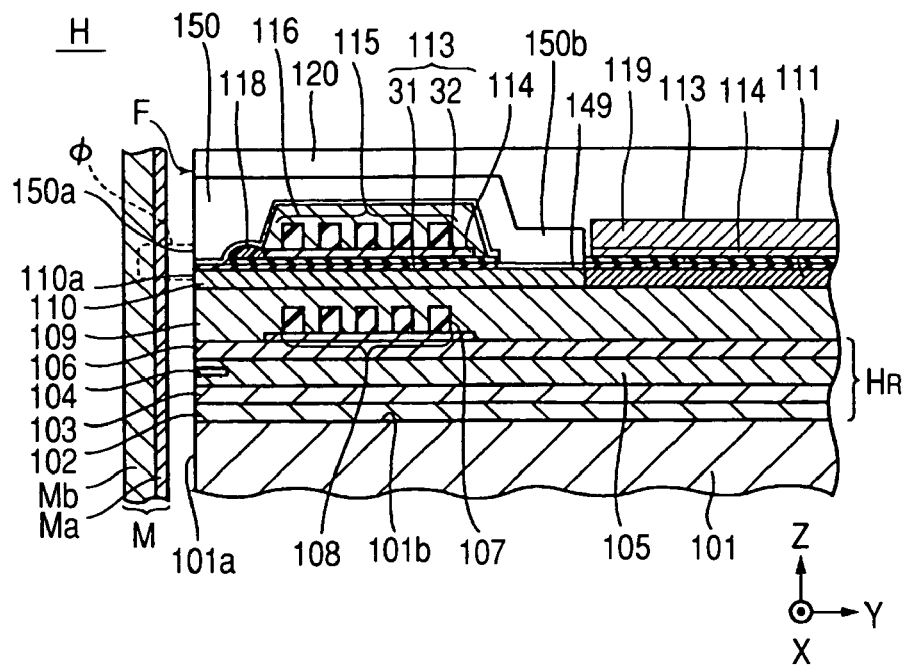
FIG. 1 is a longitudinal cross-sectional view that partially shows an entire structure of a perpendicular magnetic recording head according to an exemplary embodiment.

Preferred embodiments will now be described with reference to the drawings.

In FIGS. 1 to 4, the X direction, the Y direction, and the Z direction define a width direction of a track, a height direction (=leakage magnetic field direction from the recording medium M), and a shift direction of the recording medium M, respectively.

A magnetic head H applies a perpendicular magnetic field to the recording medium M so as to magnetize a hard film Ma of the recording medium M in a direction perpendicular thereto. The recording medium M is composed of the hard film Ma, which has a high residual magnetization and is provided at a surface of the medium, and a soft film Mb, which has a high magnetic transmittance and is provided at a side more near the rear side than the hard film Ma. The recording medium M is, for example, in the form of a disc, and the recording medium M rotates around the center of the disc serving as a rotational axis.

A slider 101 is formed of a non-magnetic material, such as Al$_2$O$_3$ or TiC, a medium facing surface 101a of the slider 101 faces the recording medium M. When the recording medium M is rotated, the slider 101 floats from a surface of the recording medium M by the airflow of the surface. Alternatively, the slider 101 slides on the recording medium M.

A non-magnetic insulating layer 102 made of an inorganic material, for example, Al$_2$O$_3$ or SiO$_2$, is formed at a trailing side end surface 101b of the slider 101, and a reading portion H$_R$ is formed on the non-magnetic insulating layer 102. The reading portion H$_R$ has a lower shield layer 103, an upper shield layer 106, an inorganic insulating layer (gap insulating layer) 105 filled between the lower shield layer 103 and the upper shield layer 106, and a reading element 104 located inside the inorganic insulating layer 105. The reading element 104 is a magneto resistive effect element, for example, AMR, GMR, or TMR.

A plurality of first coil layers 108 made of a conductive material is formed on the upper shield layer 106 by means of a coil insulating underlayer 107. The first coil layers 108 are each formed, for example, of at least one or two non-magnetic metal materials selected from, for example, Au, Ag, Pt, Cu, Cr, Al, Ti, NiP, Mo, Pd, and Rh. Alternatively, a laminate structure composed of the non-magnetic metal materials mentioned above may be formed. A coil insulating layer 109 made of the inorganic insulating material, such as Al$_2$O$_3$ or an organic insulating material, such as a resist, is formed around the first coil layers 108. An upper surface 109a of the coil insulating layer 109 is flattened, and a plated underlayer not shown in drawings is formed on the flattened surface, and a main magnetic pole layer 110 is formed on the plated underlayer.

The main magnetic pole layer 110 has a predetermined length L from a facing surface F facing the recording medium (hereinafter, refer to as "a medium facing surface") in a height direction, and a width dimension in a track width direction of a front end surface 110a exposed to the medium facing surface F is defined as a track width Tw. The main magnetic pole layer 110 is formed, for example, by plating a material having a high saturated magnetic flux density, such as Ni—Fe, Co—Fe, or Ni—Fe—Co, is used.

Figure 3:
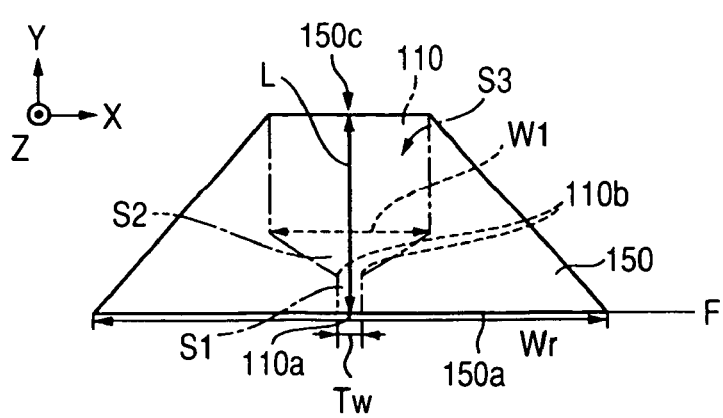
FIG. 3 is a partial plane view of the perpendicular magnetic recording head according to the exemplary embodiment.

The main magnetic pole layer 110, as shown in FIG. 3, has a front portion S1 of which the width dimension in the track width direction including the front end surface 110a is defined as the track width Tw, an inclined portion S2 extending so that a width dimension W1 in the track width direction becomes wider than the track width Tw while directing in the height direction from a base end portion 110b of the front portion S1, and a rear portion S3. More specifically, the track width Tw is formed in the range of about 0.1 to 1.0 μm, and the dimension of the height direction is formed in the range from about 0.01 to 1.0 μm. The widest width dimension W1 of the rear portion S3 in the track width direction is in the range of about 1.0 to 500 μm, and the dimension in the height direction of the inclined portion S2 and the rear portion S3 is in the range of about 0.1 to 500 μm. A first insulating material layer 111 is formed at both sides of the track width direction of the main magnetic pole layer 110 and the rear of the height direction. The insulating material layer 111 may be formed, for example, of Al$_2$O$_3$, SiO$_2$, and Al—Si—O.

A gap layer 113 is formed on the main magnetic pole layer 110 and the first insulating material layer 111. The gap layer 113 is formed such that the medium facing surface F is a single structure, which is composed of a lower gap layer 31 made of Al$_2$O$_3$, and the rear side in the height direction is a double structure, which is composed of the lower gap layer 31 and an upper gap layer 32 made of SiO$_2$, Au, and Ru. The film thickness (gap distance G2) of the rear side in the height direction is larger than the film thickness (gap distance G1) of the medium facing surface.

The lower gap layer 31 is formed over the main magnetic pole layer 110 and the first insulating material layer 111, and the gap distance G1 of the medium facing surface F is defined by the film thickness of the lower gap layer 31. The gap distance G1 in the shown embodiment is about 30 to 70 nm. The upper gap layer 32 covers the lower gap layer 31 from the position retreated from the medium facing surface F at only a predetermined distance. The front end surface 32a of the medium facing surface F is the inclined surface in which the film thickness becomes increasing toward the rear side in the height direction.

A throat height determining layer 118 made of the organic insulating material, such as a resist, is formed on the upper gap layer 32 at the position spaced from the medium facing surface F to the throat height determining layer 118 at a predetermined distance. The throat height of the perpendicular magnetic recording head H is defined by the distance from the medium facing surface F to the front end surface 118a of the throat height determining layer 118. The front end surface 118a of the throat height determining layer 118 is the inclined surface in which the film thickness becomes increasing toward the rear side in the height direction. A rising angle θ2 of the front end surface 118a of the throat height determining layer 118 and a rising angle θ1 of the front end surface 32a of the upper gap layer 32 are different to each other.

In addition, on the upper gap layer 32, second coil layers 115 are formed at the rear side of the height direction from a throat height determining layer 118 through a coil insulating underlayer 114 provided therebetween. The second coil layers 115 may be a plurality of layers formed of a conductive material. The second coil layers 115 are formed of, for example, at least one or two non-magnetic metal materials selected from, for example, Au, Ag, Pt, Cu, Cr, Al, Ti, NiP, Mo, Pd, and Rh. Alternatively, the second coil layers 115 may be a laminate structure laminated with the non-magnetic metal materials. The first coil layers 108 and the second coil layers 115 are electrically connected to each other between respective end portions in the track width direction due to a solenoid shape. The shape of the coils is not limited to the solenoid shape.

A coil insulating layer 116 made of the organic insulating material such as a resist is formed around the second coil layers 115.

A plated underlayer 149 is formed over the inclined surface 32a of the upper gap layer 32, the throat height determining layer 118, and the coil insulating layer 116 from the lower gap layer 32 of the medium facing surface F (region not covered with the upper gap layer 32). A return path layer 150 is formed on the plated underlayer 149 by means of a ferromagnetic material, such as Permalloy.

The return path layer 150 has a front end surface 150a exposing to the medium facing surface F and faces the main magnetic pole layer 110 across the gap distance G1 at the front end surface 150a. The return path layer 150 also has a connection portion 150b for connecting to the main magnetic pole layer at the rear side in the height direction and a throat portion 150c formed so as to connect to the inclined surface 32a of the upper gap layer 31 and the front end surface 118a of the throat height determining layer 118.

The throat portion 150c has the throat shape of two stages, which a slope changes at the boundary the upper gap layer 32 and the throat height determining layer 118, so that the rising angle θ2 of the front end surface 118a of the throat height determining layer 118 and the rising angle θ1 of the front end surface 32a of the upper gap layer 32 are different to each other, as described above. By the throat portion 150c of two stages, the gap distance becomes wider at the rear side in the height direction than at the medium facing surface F in the region from the medium facing surface F to the throat height Th position.

In the rear side of the height direction from a connection portion 150b of a return path layer 150, a lead layer 119 extending from the second coil layer 115 is formed through the coil insulating underlayer 114. The return path layer 150 and the lead layer 119 are covered with a protective layer 120 formed of an inorganic non-magnetic insulating material or the like.

Figure 2:
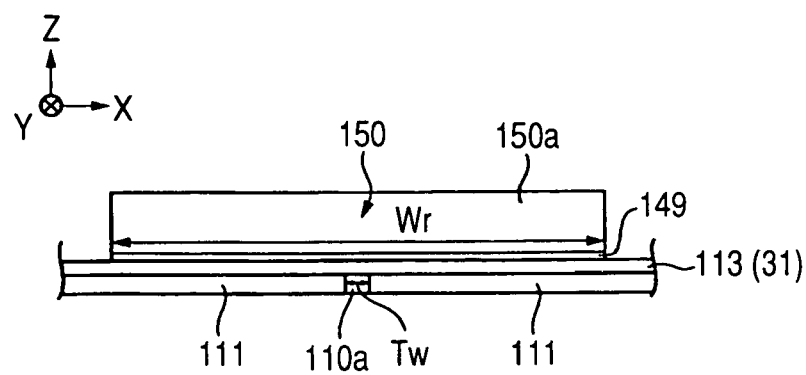
FIG. 2 is a partial front view that shows the perpendicular magnetic recording head according to the exemplary embodiment.

As shown in FIG. 2, the thickness of a front end surface 110a of the main magnetic pole layer 110 is smaller than that a front end surface 150a of the return path 150. The width dimension Tw of the front end surface 110a of the main magnetic pole layer 110 in the track width direction is sufficiently smaller than a width dimension Wr of the front end surface 150a of the return path layer 150 in the same direction. For example, at the medium facing surface F, the area of the front end surface 110a of the main magnetic pole layer 110 is sufficiently smaller than that of the front end surface 150a of the return path layer 150. A magnetic flux φ of a leakage recording magnetic field is concentrated on the front end surface 110a of the main magnetic pole layer 110, and the hard film Ma is magnetized in a perpendicular direction by the concentrated magnetic flux φ, thus recording magnetic data.

A method of manufacturing the perpendicular magnetic recording head with reference to FIGS. 4 to 7 will be described below. The method according to the invention includes a forming process of the front end portion (especially, gap layer 113) of the perpendicular magnetic recording head. Therefore, hereinafter, the front end portion of the perpendicular magnetic recording head will be described in detail.

The non-magnetic insulating layer 102, the main magnetic pole layer 110, and the first insulating material layer 111 are formed at a trailing side end surface 101b of the slider 101.

Figure 5:
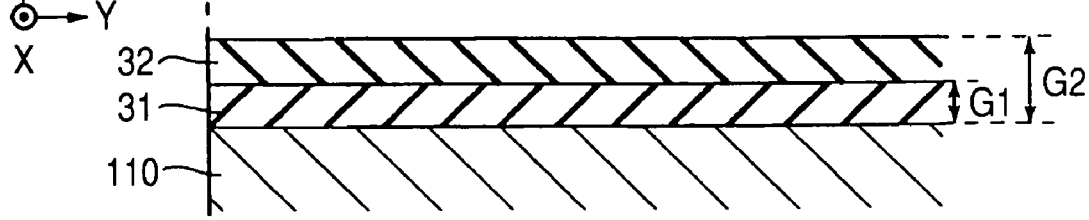
FIG. 5 is a cross-sectional view showing one process of manufacturing processes of the perpendicular magnetic recording head according to the exemplary embodiment.

As shown in FIG. 5, a lower gap layer 31 made of, for example, $Al_2O_3$ is uniformly formed on the main magnetic pole layer 110 and the first insulating material layer 111 so as to be equal to a gap distance G1 required in the medium facing surface F. In the circumstances, it is practical that the film thickness (gap distance G1) of a lower gap layer 31 is about 30 to 70 nm. A sputter method or vapor deposition method is used in forming the lower gap layer 31.

As shown in FIG. 5, an upper gap layer 32 is formed over the lower gap layer 32. The upper gap layer 32 is formed to the film thickness of about 5 to 50 nm with the non-magnetic material, for example, such as $SiO_2$, Au, or Ru having a higher etching rate than $Al_2O_3$, which is a material for forming the lower gap layer 31, and not being eroded in alkali solution. The total film thickness of the lower gap layer 31 and the upper gap layer 32 defines as a gap distance G2 of the rear side in the height direction. The upper gap layer 32 functions as a protective layer for preventing the lower gap layer 32 from being damaged during the manufacturing process. Like the lower gap layer 31, the sputter method or vapor deposition method is used in forming the upper gap layer 32.

Figure 6:
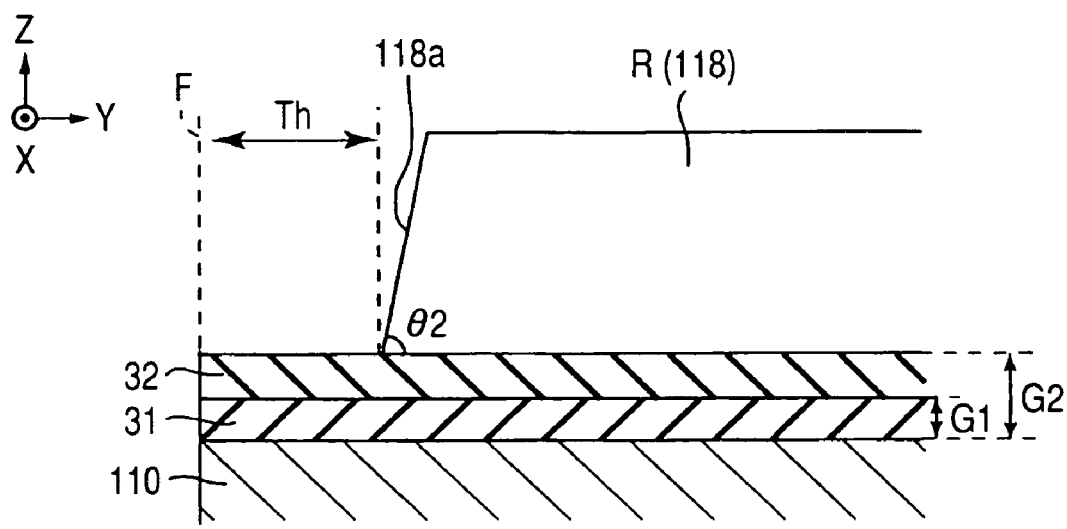
FIG. 6 is a cross-sectional view showing a subsequent process of the process shown in FIG. 5.

As shown in FIG. 6, a throat height determining layer 118 for defining a throat height Th is formed by using a photolithography technique (exposure and development). A resist layer R is formed over the upper gap layer 32, exposed, and developed. The resist layer R is removed from the end surface serving as the medium facing surface F to the position capable of obtaining a predetermined throat height Th, and the upper gap layer 32 is exposed to the removed portion. The resist layer remaining on the upper gap layer 32 serves as the throat height determining layer 118. The throat height Th is about 50 to 400 nm.

During development of the resist layer R, the developing solution made of the alkali solution is used. The lower gap layer made of $Al_2O_3$ is covered with the upper gap layer made of the non-magnetic material that is not eroded in alkali solution and not exposed to the outside. Accordingly, it may maintain naturally the film thickness of the resist layer R during forming the film without eroding by the developing solution.

In the photolithography process, a front end surface 118a of the throat height determining layer 118 is formed at the inclined surface having a rising angle $\theta 2$ (where, $0°<\theta 2<90°$) by regulating the post-bake temperature so that the film thickness of the front end surface 118a increases up to the rear side in the height direction.

The second coil layer 115 is formed at the rear side in the height direction more than the throat height determining layer 118 on the upper gap layer 32, and the second coil layer 115 and a coil insulating layer 116 filling a void thereof are completely formed.

Figure 7:
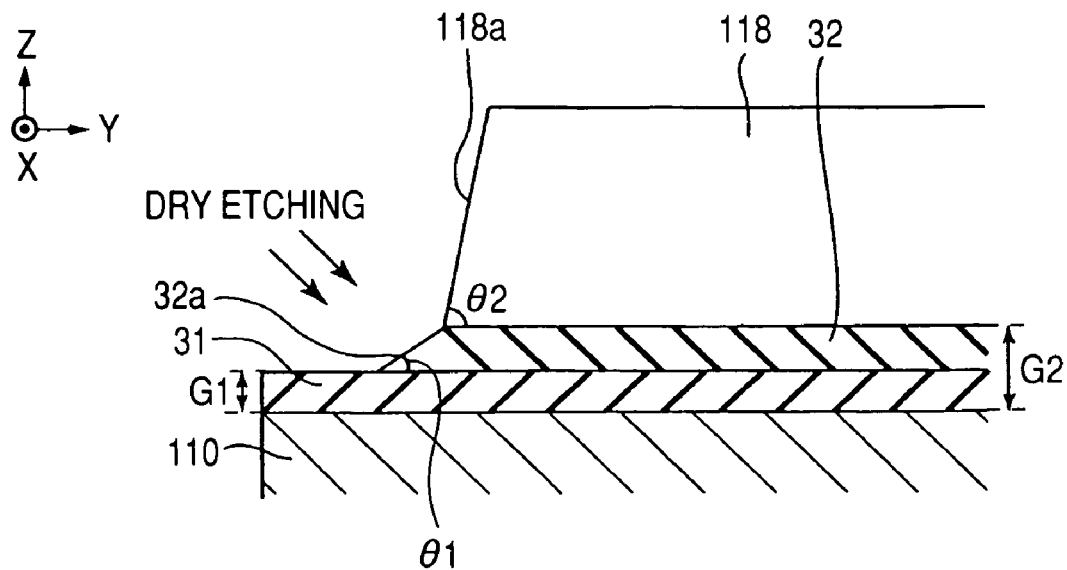
FIG. 7 is a cross-sectional view showing a subsequent process of the process shown in FIG. 6.

If the coil insulating layer 116 is formed, as a treatment prior to the plate of a return path layer to be formed in the following process, a dry etching treatment, such as a milling, is performed. In the dry etching process, as shown in FIG. 7, a new film surface is exposed by cutting the surface of the throat height determining layer 118 and the coil layer 116 and then removing an oxidation layer of the surface. The upper gap layer 32 not covered with the throat height determining layer 118 is removed, and the lower gap layer 31 is exposed to the removed region. For example, the dry etching treatment is continued until the lower gap layer 31 is exposed to the end surface serving as the medium facing surface F. If the lower gap layer 31 is exposed, the dry etching treatment is finished. Since the etching rate of the lower gap layer 31 is lower than that of the upper gap layer 32, the timing of the etching completion may be controlled with a high precision by detecting whether the lower gap layer 32 is exposed or not. As described above, the lower gap layer 31 exposed to the medium facing surface F is favorably maintained the film thickness during forming the film.

In the dry etching process, a front end surface 32a of the upper gap layer 32 is formed at the inclined surface having the rising angle $\theta 1$ ($0°<\theta 1<85°$) by regulating the etching angle so that the film thickness of the front end surface 32a increases up to the rear side in the height direction. The rising angle (1 of the upper gap layer 32 differs from the rising angle (2 of the throat height determining layer 118.

The single structure of the lower gap layer 31 is formed from the end surface serving as the medium facing surface F to the neighborhood of the throat height Th position by the dry etching process, and the double structure of the lower gap layer 31 and the upper gap layer 32 is formed at the rear side in the height direction more than the throat height Th position. As described above, the gap layer 113 is obtained. The thickness of the gap layer 113 is larger at the region, in which the second coil layer 115 is formed, for example, at the rear side in the height direction than the throat height Th position than when only the lower gap layer 31 is formed.

Figure 4:
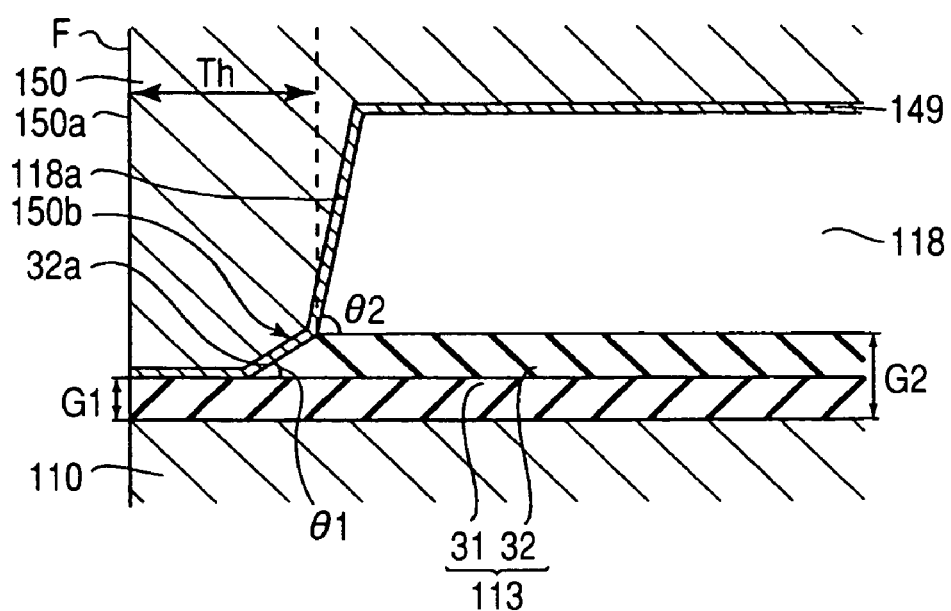
FIG. 4 is an enlarged cross-sectional view that partially shows a front end portion of the perpendicular magnetic recording head according to the exemplary embodiment.

The plated underlayer 149 is formed over the lower gap layer 31 exposed to the end surface serving as the medium facing surface F, the front end surface 32a of the upper gap layer 32, the throat height determining layer 118, and the coil insulating layer 116, and the return path layer 150 is formed on the plated underlayer 149 by plating. As described above, the end surface 32a of the upper gap layer 32 and the end surface 118a of the throat height determining layer 118 are the inclined surface having the rising angles (1 and (2, respectively, and the rising angles (1 and (2 are different to each other. Therefore, as shown in FIG. 4, the two stages throat portion 150b of which a slope changes at the boundary the upper gap layer 32 and the throat height determining layer 118 is formed on the return path layer 150. Since the throat shape of the return path layer 150 is changed to the two stages and formed, and the gap distance becomes wider at the rear side in the height direction than at the medium facing surface F in the narrow region from the end surface serving as the medium facing surface F to the throat height Th position, even though the throat height Th is lengthwise assured.

A recording magnetic field strength may be well maintained and the recording resolution (recording magnetic field inclination) and the writing performance (recording magnetic field strength) may be controlled with good balance. The magnitude relation of the rising angles (1 and (2 of the upper gap layer 32 and the throat height determining layer 118 is properly set according to the desired recording resolution and the writing performance.

If the return path layer 150 is formed, a lead layer 119 is formed at the rear side in the height direction more than the return path layer 150, and a protective layer 120 is formed so as to cover the lead layer 119 and the return path layer 150.

The medium facing surface F is formed by machining (ABS processing) the end surface serving as the medium facing surface F. In the medium facing surface F, the lower gap layer 31 is exposed between the main magnetic pole layer 110 and the return path layer 150, and the main magnetic pole layer 110 faces the return path layer 150 by means of the gap distance G1 equal to the thickness of the lower gap layer 31.

The perpendicular magnetic recording head shown in FIGS. 1 to 4 is obtained.

In the exemplary embodiment, since the gap layer 113 is formed as the double structure having the lower gap layer which is weak in the alkali solution and the upper gap layer which is not eroded in alkali solution and is well etched (milling) more than the lower gap layer 31, the upper gap layer 32 of the medium facing surface F is removed during the pre-treatment of the plating (milling), and the lower gap layer 31 is exposed. The return path layer 150 is formed on the exposed lower gap layer 31. Accordingly, since the lower gap layer 31 is protected by the upper gap layer 32, while not suffering damage by the etching or the alkali developing solution during the manufacturing process, the gap distance G1 in the medium facing surface F is accurately defined by the thickness during forming film of the lower gap layer 31.

In order to accurately define the gap distance G1 at the medium facing surface F, it is considerable that the gap layer having the single structure formed of the non-magnetic material, for example, $SiO_2$, Au, Ru and other suitable elements, which are not eroded in the alkali solution. However, it has problems that when the gap layer is formed of only $SiO_2$, the gap layer is protruded from the medium facing surface F during the ABS processing, and when the gap layer is formed of only Au or Ru, the smearing occurs. Accordingly, it is not preferable that the gap layer is formed of the non-magnetic material.

In the exemplary embodiment, since the etching rate of the upper gap layer 32 is higher than that of the lower gap layer 31, the timing of the etching completion may be controlled with a high precision by detecting whether the lower gap layer 32 is exposed or not.

In this exemplary embodiment, since the throat shape of the return path layer 150 is formed to the two stages by allowing the rising angles θ1 and θ2 of the end surface 32a of the upper gap layer 32 and the end surface 116a of the coil insulating layer 116 to differ, the recording resolution and the writing performance may be controlled with good balance by adjusting the magnitude relation of the rising angles θ1 and θ2.

Even though the exemplary embodiment defines the throat height Th by the throat height determining layer 117 formed on the upper gap layer 32, it is applicable to an embodiment which defines the throat height Th by the coil insulating layer 116 without providing the throat height determining layer 118. For example, it is applicable to an embodiment that combines the coil insulating layer 116 with the throat height determining layer 118. In a case where the coil insulating layer 116 is used together with the throat height determining layer 118, the end surface 116a of the coil insulating layer 116 is formed at the inclined surface of the rising angle θ2, and the distance from the medium facing surface F to the end surface 116a of the coil insulating layer 116 is the throat height. After the film formation using the inorganic insulating material, for example $Al_2O_3$ or $SiO_2$, the throat height determining layer 118 is defined and shaped by the milling or a reactive ion etching (RIE).

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

What is claimed is:

1. A method of manufacturing a perpendicular magnetic recording head, comprising:
    forming a lower gap layer made of a non-magnetic material on a main magnetic pole layer;
    forming an upper gap layer on the lower gap layer;
    forming a resist layer on the upper gap layer;
    removing a portion of the resist layer that corresponds to a range of an end surface serving as a medium facing surface to a position, at which a predetermined throat height is obtained so that the upper gap layer is exposed through the removed portion;
    performing a dry etching as a plating pre-treatment to expose a new surface of the resist layer and to remove an area of the upper gap layer that is not covered with the resist layer, so that the lower gap layer is exposed through the removed area; and
    forming a plating underlayer on the exposed lower gap layer, the upper gap layer, and the resist layer, and forming a return path layer on the plating underlayer by plating.

2. The method of manufacturing a perpendicular magnetic recording head according to claim 1,
    wherein a rising angle of the end surface of the medium facing surface of the upper gap layer is different from a rising angle of the end surface of the medium facing surface of the resist layer.

3. The method of manufacturing a perpendicular magnetic recording head according to claim 2,
    wherein the rising angle of the end surface of the medium facing surface of the upper gap layer is controlled by an etching angle in the plating pre-treatment.

4. The method of manufacturing a perpendicular magnetic recording head according to claim 1,
    wherein when a developing solution used during development of the resist layer is alkali solution, the lower gap layer is formed of $Al_2O_3$.

5. The method of manufacturing a perpendicular magnetic recording head according to claim 4, wherein the upper gap layer is formed of any one of $SiO_2$, Ru, and Au.

6. The method of manufacturing a perpendicular magnetic recording head according to claim 1,
    wherein the resist layer is a coil insulating layer that covers a coil layer that applies a recording magnetic field to the main magnetic pole layer and the return path layer.

7. The method of manufacturing a perpendicular magnetic recording head according to claim 1,
    wherein a thickness of the lower gap layer is in a range of about 5 nm to 150 nm.

8. The method of manufacturing a perpendicular magnetic recording head according to claim 1, wherein the lower gap layer has a thickness equal to a predetermined gap distance.

9. The method of manufacturing a perpendicular magnetic recording head according to claim 1, wherein the upper gap layer is a non-magnetic material, which is not eroded by a developing solution and which has an etching rate higher than a material of the lower gap layer.

10. The method of manufacturing a perpendicular magnetic recording head according to claim 1, wherein the upper gap layer is formed of any one of $SiO_2$, Ru, and Au.

* * * * *